United States Patent
Gupta et al.

(10) Patent No.: US 10,708,379 B1
(45) Date of Patent: Jul. 7, 2020

(54) DYNAMIC PROXY FOR DATABASES

(71) Applicant: Amazon Technologies, Inc., Seattle, WA (US)

(72) Inventors: Anurag Windlass Gupta, Atherton, CA (US); Saileshwar Krishnamurthy, Palo Alto, CA (US); Alexey Kuznetsov, New Westminster (CA); Sandor Loren Maurice, Vancouver (CA); Alok Nandan Nikhil, Seattle, WA (US); Nicholas Piers O'Shea, Seattle, WA (US); Debanjan Saha, Los Altos, CA (US); Yoni Shalom, Vancouver (CA); Jagdeep Singh Sidhu, Vancouver (CA); Hongbo Song, Issaquah, WA (US); Lawrence Douglas Webley, Seattle, WA (US); Siyuan Xing, Issaquah, WA (US); Yuhui Yuan, Seattle, WA (US); Yibo Zhu, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 15/943,634

(22) Filed: Apr. 2, 2018

Related U.S. Application Data

(60) Provisional application No. 62/590,222, filed on Nov. 22, 2017.

(51) Int. Cl.
    *G06F 16/245* (2019.01)
    *H04L 12/24* (2006.01)
    *H04L 29/08* (2006.01)
    *G06F 11/34* (2006.01)
    *H04L 29/06* (2006.01)
    (Continued)

(52) U.S. Cl.
    CPC ...... *H04L 67/2838* (2013.01); *G06F 11/3409* (2013.01); *G06F 16/23* (2019.01); *G06F 16/245* (2019.01); *G06F 16/252* (2019.01); *H04L 69/22* (2013.01); *H04L 41/0806* (2013.01)

(58) Field of Classification Search
    CPC ...... G06F 16/245; G06F 16/23; G06F 16/252; H04L 69/22
    See application file for complete search history.

(56) References Cited

U.S. PATENT DOCUMENTS

| | | | |
|---|---|---|---|
| 7,426,515 B2 | 9/2008 | Hind et al. | |
| 8,606,930 B1 * | 12/2013 | Jain | H04L 47/522 709/227 |
| 9,313,172 B1 * | 4/2016 | Brandwine | H04L 63/0236 |

(Continued)

*Primary Examiner* — Joshua Joo
(74) *Attorney, Agent, or Firm* — Robert C. Kowert; Kowert, Hood, Munyon, Rankin & Goetzel, P.C.

(57) ABSTRACT

A dynamic proxy may be implemented for a database that can establish a connection between the proxy and a database engine to perform a database queries received from a client at the proxy. The proxy may receive a connection request (and later database queries) through a first network endpoint from a client. The proxy can then determine based on the source of the connection request a second network endpoint through which to access the database (e.g., the endpoint of the database engine). Once the proxy establishes a connection with the database engine through the second network endpoint, the proxy can request the performance of queries at the database engine instead of the client.

19 Claims, 11 Drawing Sheets

(51) Int. Cl.
  *G06F 16/23* (2019.01)
  *G06F 16/25* (2019.01)

(56) References Cited

U.S. PATENT DOCUMENTS

| | | | | |
|---|---|---|---|---|
| 9,491,201 | B2* | 11/2016 | Bagepalli | H04L 63/166 |
| 9,589,029 | B2 | 3/2017 | Choudhary et al. | |
| 2004/0076155 | A1* | 4/2004 | Yajnik | H04L 45/306 |
| | | | | 370/389 |
| 2008/0080505 | A1* | 4/2008 | Munoz | H04L 45/00 |
| | | | | 370/392 |
| 2008/0239961 | A1* | 10/2008 | Hilerio | H04L 41/5009 |
| | | | | 370/235 |
| 2011/0264800 | A1* | 10/2011 | Allred | H04L 29/125 |
| | | | | 709/224 |
| 2012/0036178 | A1* | 2/2012 | Gavini | G06F 9/5027 |
| | | | | 709/203 |
| 2012/0271803 | A1* | 10/2012 | Ferguson | G06F 16/27 |
| | | | | 707/703 |
| 2015/0269186 | A1* | 9/2015 | Kimball | H04L 67/2814 |
| | | | | 709/217 |
| 2016/0088022 | A1* | 3/2016 | Handa | G06F 16/957 |
| | | | | 726/1 |
| 2016/0278140 | A1* | 9/2016 | Sung | H04L 12/4633 |
| 2016/0285759 | A1* | 9/2016 | Ryan | H04L 45/74 |
| 2017/0024548 | A1* | 1/2017 | Dorwin | G06F 21/105 |
| 2017/0085468 | A1* | 3/2017 | Modi | H04L 45/22 |
| 2017/0289294 | A1* | 10/2017 | Cohen | H04L 67/32 |
| 2017/0331674 | A1* | 11/2017 | Wang | H04L 67/1002 |
| 2018/0025007 | A1* | 1/2018 | Dai | G06F 16/2455 |
| | | | | 707/770 |
| 2018/0069780 | A1* | 3/2018 | Dhanabalan | H04L 45/124 |
| 2018/0270309 | A1* | 9/2018 | Ergin | H04L 67/1097 |
| 2019/0215166 | A1* | 7/2019 | Prince | H04L 63/0823 |

* cited by examiner

DYNAMIC PROXY FOR DATABASES

RELATED APPLICATIONS

This application claims benefit of priority to U.S. Provisional Application Ser. No. 62/590,222, entitled "MULTI-TENANT DATABASE PROXY SERVICE," filed Nov. 22, 2017, and which is incorporated herein by reference in its entirety.

BACKGROUND

Commoditization of computer hardware and software components has led to the rise of service providers that provide computational and storage capacity as a service. At least some of these services (e.g., managed services such as managed relational database services) can be difficult to scale, including scaling the processing capacity. Disruption of an application or other process can be a high cost associated with changing capacity to better match workloads, as client applications may be interrupted due to dropped connections (and may not even retry to connect, in some instances). Techniques that can support scaling resources to match workloads therefore are highly desirable.

Figure 1:
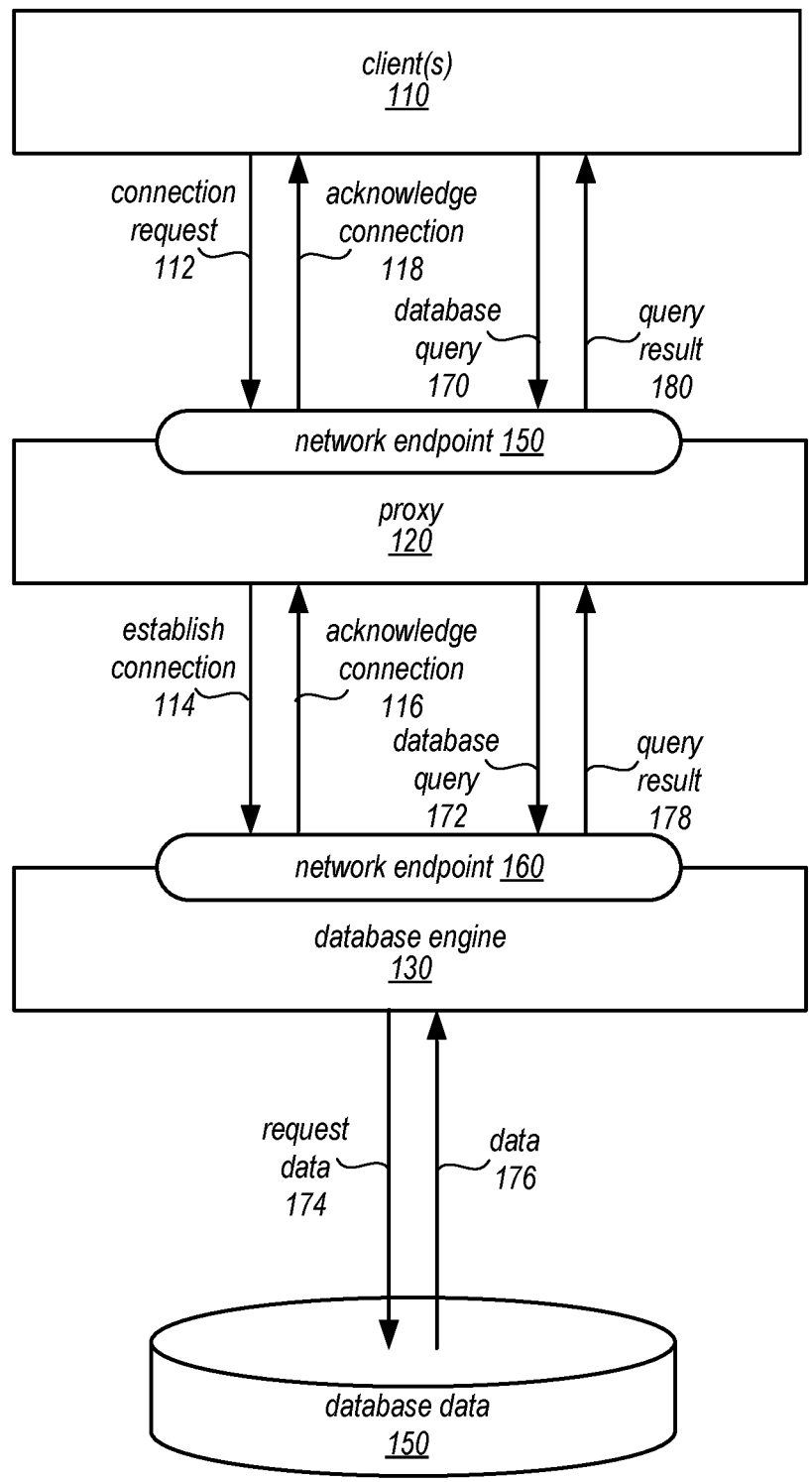
FIG. 1 is a logical block diagram illustrating a dynamic proxy for databases, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

In various embodiments, a dynamic proxy for databases may be implemented. For example, a provider network or other database system or service may implement a dynamic database proxy (e.g., as a multi-tenant proxy for a plurality of databases on behalf of a plurality of clients) to serve as an intermediary connection between a database client and database. In this way, various database management operations may be performed without disrupting the connection of the client (e.g., leading to client application downtime, failures, service interruptions, etc.), in some embodiments. For example, a first client request for a given database may trigger an initial provisioning of computing resources of the database service for the given database, as discussed below with regard to FIG. 6 (which may also save resource costs by not provision computing resources for a database connection until that database connection is received, reducing idle computing resources and improving the efficiency of a database service or system as a whole). In another example, client requests can be monitored to establish application workloads for use in automated or intelligent resource provisioning to dynamically adjust resources for databases transparent to the applications based on the established application workloads, models of application workloads, or client profiles so that resources are not wasted when performing automated management of databases for a user.

Client applications may connect to a proxy over a network via a first network endpoint and send database requests via the proxy instead of the database engine or host directly, in some embodiments. The proxy may then identify a second network endpoint for the database engine to provide access to the database and establish a separate connection with the database engine, in some embodiments. The proxy may maintain open client application connections while database management operations are performed, in various embodiments. In this way, a client application may connect to the proxy independent of the underlying database architecture and avoid imposing modifications on client applications, in some embodiments. Furthermore, the client application may be unaware of the underlying database systems as the client may only communicate with the proxy because the proxy may maintain separate secure communications mechanisms for the client and the database service, (e.g., by separately encrypting and decrypting database requests independently between the client application and the database engine) which may prevent the client from having to reestablish ac connection in the event of interruptions or other failures at the underlying database system, in some embodiments.

FIG. 1 is a logical block diagram illustrating a dynamic proxy for databases, according to some embodiments. Client(s) 110 may send a connection request 112 to a network endpoint 150, in some embodiments. Network endpoint 150 may be a network address or interface associated with the database targeted by the connection request (e.g., in a virtual private network of client 110 as discussed below with regard to FIG. 6), in some embodiments. A proxy 120 may be able to receive or otherwise intercept the request 112 through network endpoint 150, in some embodiments. Proxy 120 may then identify a second network endpoint 160 through access to the database may be obtained and establish a connection 114 with an appropriate database engine. In various embodiments, mapping information or other routing decisions for a database connection request may be determined according to information additional to the connection request itself. Instead of relying upon a database communication protocol which may not specify particular database engines or databases, ins some embodiments, as the protocol may assume that the database engine is correctly targeted directly by the request, proxy 120 may access information describing or identifying of the source of the request (e.g., network endpoint 150 which may be mapped to the private network of client 110 and thus identify client 110 as the source of the request).

Once proxy 120 obtains an acknowledgement 116 of the connection made with database engine 130, proxy 120 may acknowledge 118 (and thus establish) the connection with client 110, in some embodiments. In this way, client(s) 110 can proceed to send database queries, such as database query 170, which may be forwarded 172 by proxy 120 to database engine 130. Database engine 130 may then request 174 and obtain the appropriate data 176 to perform the query, in some embodiments, and provide a result 178 to proxy 120. Proxy 120 may in turn provide a result 180 for the query to client 110 (which may experience a minimal latency increase due to lightweight network traffic processing techniques, as discussed below with regard to FIG. 9), in some embodiments.

Please note, FIG. 1 is provided as a logical illustration of clients, proxies, database engines, database data, network endpoints, and respective interactions and is not intended to be limiting as to the physical arrangement, size, or number of components, modules, or devices to implement such features. For example, in some embodiments, load balancing may be implemented to select a proxy, as discussed below with regard to FIGS. 3 and 6.

The specification first describes an example proxy service that provides access to a database service using dynamic proxies for databases, Included in the description of the example network-based database service are various aspects of the example network-based database service, such as a database engine head node proxy service, including proxy nodes, and a separate storage service, including storage nodes. The specification then describes flowcharts of various embodiments of methods for implementing a dynamic proxy for databases. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the aforementioned layers), and then adding glue logic to stitch them together. In some embodiments, the systems described herein may instead offload the functionality of the durability and space management layer from the database tier to a separate storage layer, and may distribute that functionality across multiple storage nodes in the storage layer.

In some embodiments, the database systems described herein may retain much of the structure of the upper half of the database instance discussed in the example above, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, the database tier of a database instance may include a database engine head node that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, database engine head node (or various components thereof) may generate redo log records and may ship them to the appropriate nodes of a separate distributed storage system. In some embodiments, a client-side driver for the distributed storage system may be hosted on the read-write node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the read-write node). For example, in embodiments in which data is made durable through the use of protection groups, the database engine head node may not be able to commit a transaction until and unless the client-side driver receives a reply from enough storage node instances to constitute a write quorum.

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments.

In some embodiments, the client-side driver(s) running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver(s) (may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may determine the one or more nodes that are implementing the storage for the targeted data page (e.g., based on storage metadata for the distributed storage system), and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

Figure 2:
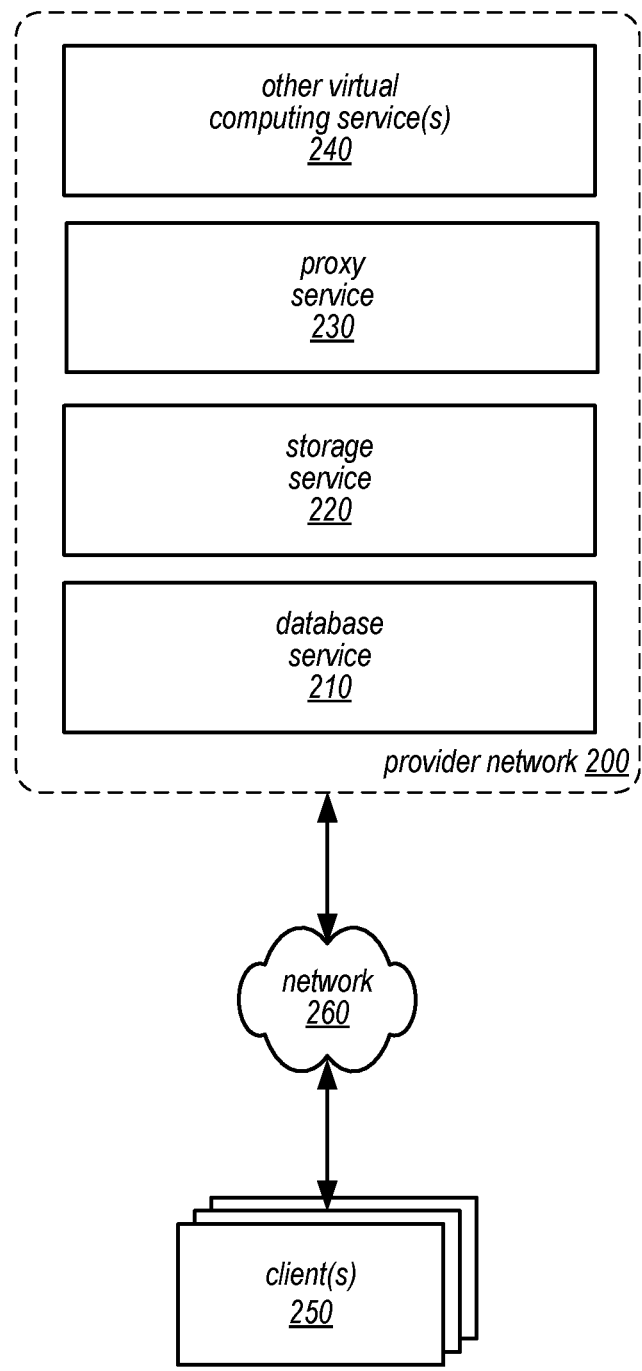
FIG. 2 is a logical block diagram illustrating a provider network that implements a proxy service for databases accessed by a database service and stored in a storage service, according to some embodiments.

FIG. 2 is a logical block diagram illustrating a provider network that implements a proxy service for databases accessed by a database service and stored in a storage service, according to some embodiments. A provider network may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions, that may include one or more data centers hosting various resource pools, such as collections of physical and/or virtualized computer servers, storage devices, networking equipment and the like (e.g., computing system 2000 described below with regard to FIG. 12), needed to implement and distribute the infrastructure and storage services offered by the provider network within the provider network 200.

A number of clients (shown as clients 250 may interact with a provider network 200 via a network 260, in some embodiments. Provider network 200 may implement database service 210, storage service 220, proxy service 230, and/or one or more other virtual computing services 240. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client that can submit network-based services requests to provider network 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style web services architecture, a document- or message-based network-based services architecture, or another suitable network-based services architecture.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment. Although client(s) 250 are illustrated as external to provider network 200, in some embodiments, internal clients, such as applications or systems implemented on other virtual computing resources may make use of a database hosted by database service 210 by accessing the database using a dynamic proxy implemented as part of proxy service 230.

Clients 250 may convey network-based services requests to and receive responses from provider network 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with provider network 200 using a private network rather than the public Internet. For example, clients 250 may be provisioned within the same enterprise as a database service system (e.g., as part of another network-based service in provider network 200 which also offers database service 210 and/or storage service 220). In such a case, clients 250 may communicate with platform 200 entirely through a virtual private network 260 (e.g., a LAN or WAN that may use Internet-based communication protocols but which is not publicly accessible).

Generally speaking, provider network 200 may implement one or more service endpoints may receive and process network-based services requests, such as requests to access data pages (or records thereof). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, storage service 220 and/or another virtual computing service 230 for processing. In other embodiments, provider network 200 may be implemented as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

Provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220, proxy service 230 and/or another virtual computing service 240 (or the underlying systems that implement those services).

In some embodiments, proxy service 230 and/or database service 210 may implement user authentication and access control procedures. For example, for a given network-based services request to access a particular database table, a proxy node may ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, the proxy node may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network 200 to provide storage of database tables or other information for applications other than those that rely on database service 210 for database management. In such embodiments, clients of the storage service 220 may access storage service 220 via network 260 (e.g., over the Internet). In some embodiments, a virtual computing service may receive or use data from storage service 220 (e.g., through an API directly between the virtual computing service and storage service 220) to store objects used in performing computing services on behalf of a client 250. In some cases, the accounting and/or credentialing services of provider network 200 may be unnecessary for internal clients such as administrative clients or between service components within the same enterprise.

Figure 3:
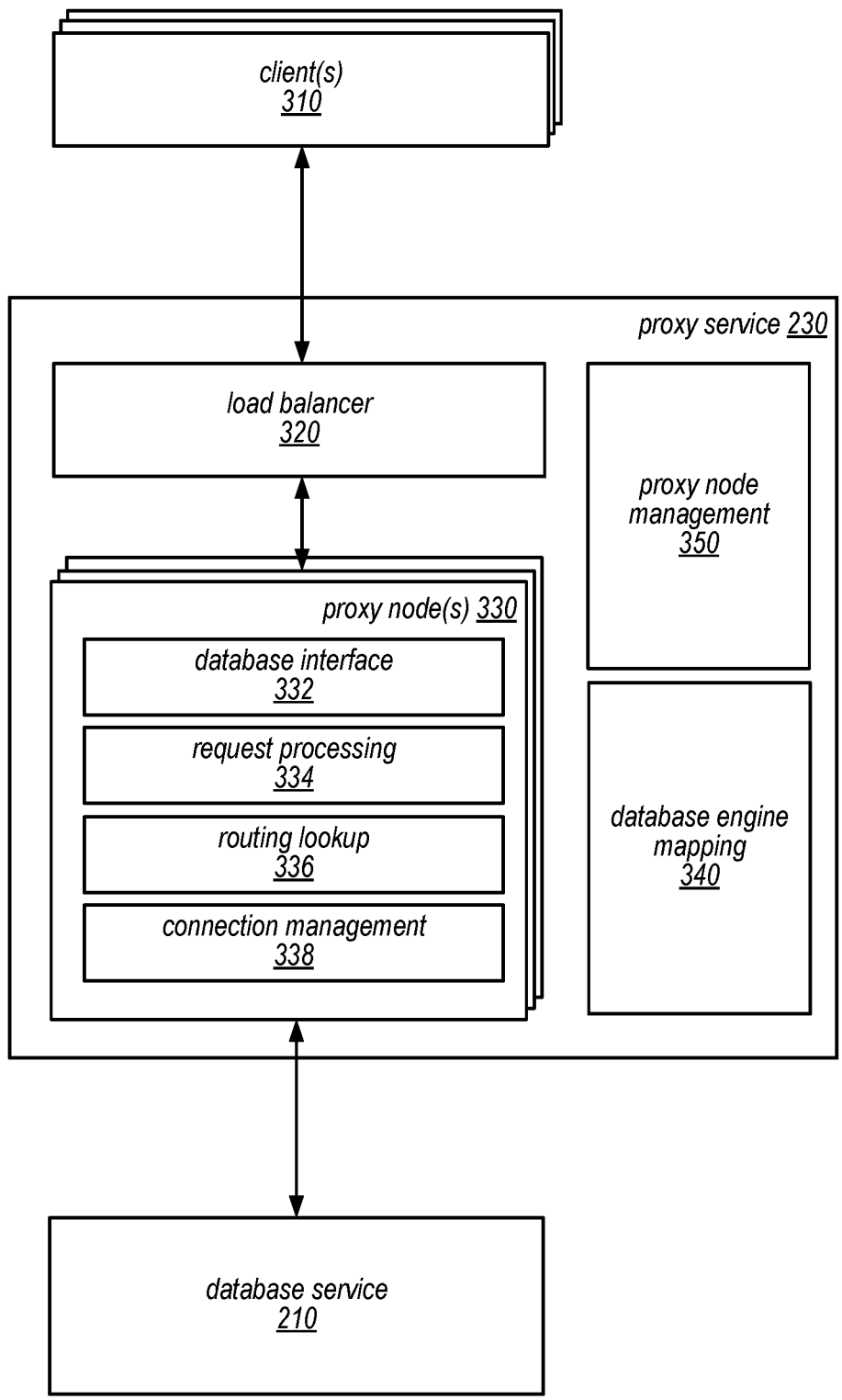
FIG. 3 is a logical block diagram illustrating a proxy service that implements a dynamic proxy for databases, according to some embodiments.

FIG. 3 is a logical block diagram illustrating a proxy service that implements a dynamic proxy for databases, according to some embodiments. Clients 310 may be similar to clients 110 in FIG. 1, clients 250 in FIG. 2, or other clients, such as internal clients or applications of provider network 200. Clients 310 may access database service 210 via one or more proxy node(s) 330 implemented as part of proxy service 230, in some embodiments.

Proxy service 230 may implement a load balancer 320, in some embodiments, which may apply one or more load balancing schemes (e.g., round-robin, hashing, least connections, etc.) to distribute connection requests from clients to different proxy nodes 330. For example, a connection request to a database from client A may be directed to proxy node A to connect database A. A second connection to database A from client B may however be directed to proxy node B by load balancer 320, even though the databases are the same, in some embodiments. Load balancer 320 may be implemented by one or more computing nodes, servers, or other networking devices, such as computer system 2000 in FIG. 12. In at least some embodiments, a networking interface and/or network control service implemented as part of provider network 200 may, in some embodiments, implement private networks (or virtual private networks) within provider network 200 that include client(s) 310. Load balancer 320 may be able to implement requests directed a network interface or other network endpoint for the virtual private network of client 310 in order to direct requests through proxy service 230 to a virtual private network implementing a database engine in database service 210, in some embodiments.

Proxy service 230 may implement a fleet, pool, or group of one or more proxy node(s) 330 to provide access to database engines for client(s) 310, in some embodiments. Proxy nodes 320 may be implemented on one or more computing devices, servers, or other systems, such as computer system 2000 in FIG. 12 below), in some embodiments. Proxy node(s) 330 may implement a database interface 332 that corresponds, matches, or otherwise interprets requests from client(s) 310 in order to mimic or otherwise make the interactions between the proxy node 330 and the client 310 simulate a direct connection between client 310 and a database engine, in some embodiments. Proxy node(s) 330 may implement request processing 334, in some embodiments, to select various actions to perform based on the network traffic received from a client, such as by examining network packet metadata, as discussed below with regard to FIG. 9. In some embodiments, request processing 334 may perform encryption and decryption according to the encryption schemes implemented between client(s) 310 and proxy 330, and between proxy 330 and a database engine in database service 210, in order to ensure that communication with proxy is encrypted both for interactions clients 310 and with a database engine database service 210. Proxy node(s) 339 may implement routing lookup 336 to access database engine mapping 340 in order to locate, determined, or otherwise identify a network endpoint and thus a database engine to connect with in response to a connection request from a client 310, in some embodiments, as discussed below with regard to FIGS. 6 and 8. In some embodiments, database engine mapping 340 may be stored as part of a separate database service that provides high-throughput and ensures consistent views of mapping information, in some embodiments (e.g., a NoSQL database service implemented as part of provider network 200).

Proxy nodes 330 may, in some embodiments, implement connection management 338 in order to manage the connections between proxy node 330 and various clients 310 and various database engines in database service 210. For example, connection management 338 may implement or impose various limitations on connection requests, as discussed below with regard to FIG. 10. In some embodiments, connection management 338 may freeze, block, or otherwise indicate (e.g., to load balancer 320) that a proxy node 330 is no longer accepting connections, in some embodiments. In some embodiments, connection management may implement various techniques to disconnect or otherwise end connections, as discussed below with regard to FIG. 11. In some embodiments, proxy node(s) 330 may be multi-tenant. For example, proxy nodes 330 may maintain connections with different clients and different database engines for different databases (e.g., associated with different user accounts of database service 210 or provider network 200). In some embodiments, connection management 338 may implement various security mechanisms or controls to ensure that data for different connections is isolated.

Proxy service 230 may implement proxy node management 350 in various embodiments, to provision, support, or otherwise maintain a pool of proxy nodes 330 for providing access to database service 210. For example, proxy node management 350 may start, launch or provision new proxy nodes if the number of proxy nodes (or potential connections supported) falls below a threshold amount, proxy node management 350 may add proxy nodes 330 to the pool. In some embodiments, proxy node management 350 may restart or shutdown proxy nodes (e.g., suspected of malicious behavior or under attack from malicious requests).

Figure 4:
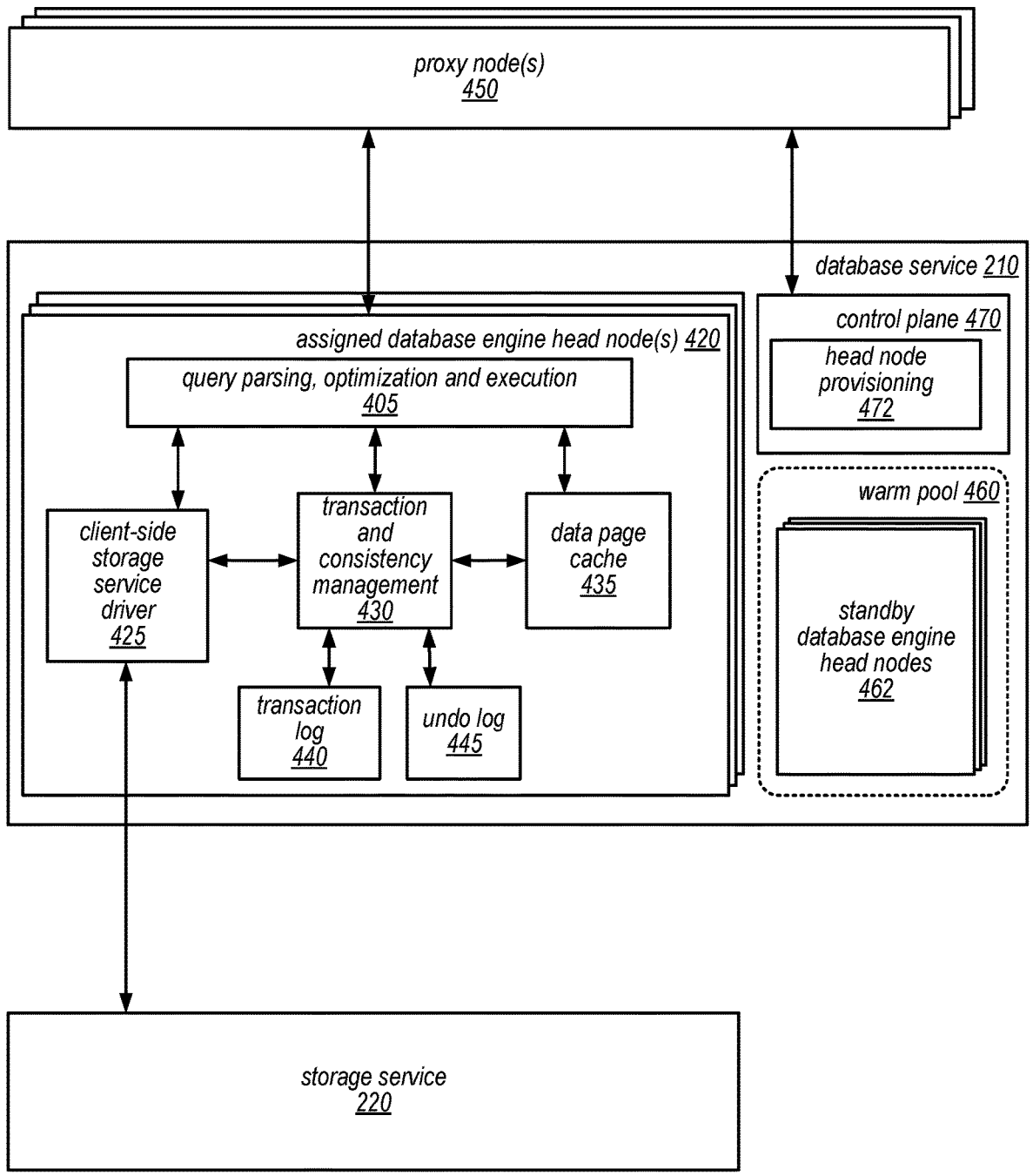
FIG. 4 is a logical block diagram illustrating a database service, according to some embodiments.

FIG. 4 is a logical block diagram illustrating a database service, according to some embodiments. Database service 210 may implement respective database engine head nodes, which may be provisioned, launched, connected, or otherwise assigned to provide access to a database stored in storage service 220, such as assigned database engine head nodes 420a, 420b, and 420c, according to connections from proxy nodes 450 which act as clients on behalf clients that are connected with proxy node(s) 450, as discussed above. Proxy node(s) 450 may access a database engine head node 420 via a network (e.g., these components may be network-addressable and accessible to the clients 450a-450n), in some embodiments. Storage service 220, which may be employed by the database system to store data pages of one or more database tables (and redo log records and/or other metadata associated therewith), and to perform other functions of the database system as described herein, may or may not be network-addressable and accessible to proxy node(s) 450, in different embodiments. For example, in some embodiments, storage service 220 may perform various storage, access, change logging, recovery, and/or space management operations in a manner that is invisible to proxy node(s) 450.

Database engine head node 420 may receive requests from various client programs (e.g., applications) and/or subscribers (users) via proxy node(s) 450, then parse them, optimize them, and develop an execution plan to carry out the associated database operation(s), in some embodiments. In the example illustrated in FIG. 4, a query parsing, optimization, and execution component 405 of database engine head 420 may perform these functions for queries that are received from proxy node 450 and interact with database engine head node 420 via connection established by proxy node(s) 450. In some embodiments, the query parsing, optimization, and execution component 405 may return query responses to proxy node 450, which may include write acknowledgements, requested data pages (or portions thereof), error messages, and or other responses, as appropriate. As illustrated in this example, database engine head node 420 may also include a client-side storage service driver 425, which may route read requests and/or change notifications (e.g., redo log records) to various storage nodes within storage service 220, as discussed below, receive write acknowledgements from storage service 220, receive requested data pages from storage service 220, and/or return data pages, error messages, or other responses to the query parsing, optimization, and execution component 405 (which may, in turn, return them to proxy node 450). In some embodiments, client-side storage driver 425 may have access to storage metadata. Storage metadata may provide an access scheme for obtaining or writing to distributed storage service 410 (e.g., mapping information to one or more components within storage service 410 storing data for a database system 400). When routing read or write requests to storage service 410, client-side storage driver 448 may access storage metadata to determine the particular storage nodes to send read or write requests to.

In this example, database engine head node 420 includes data page cache 435, in which data pages that were recently accessed (read and/or write) may be temporarily held. As illustrated in FIG. 4, database engine head node 420 may also include transaction and consistency management component 430, which may be responsible for providing transactionality and consistency in the database instance of which database engine head node 420 is a component. For example, this component may be responsible for ensuring the Atomicity, Consistency, and Isolation properties of the database instance and the transactions that are directed that the database instance. As illustrated in FIG. 4, database engine head node 420 may also include transaction log 440 and undo log 445, which may be employed by transaction and consistency management component 430 to track the status of various transactions and roll back any locally cached results of transactions that do not commit.

Database service 210 may implement warm pool 460, which may include one or more standby database engine head nodes 462. These standby database engine head nodes may be ready for provisioning according to the techniques discussed below with regard to FIG. 6. Database service 210 may implement control plane 470 to perform various management operations for database engine head nodes, including head node provisioning 472, as discussed below with regard to FIG. 6.

In some embodiments, a storage device may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An storage device is not necessarily mapped directly to hardware. For example, a single storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 5:
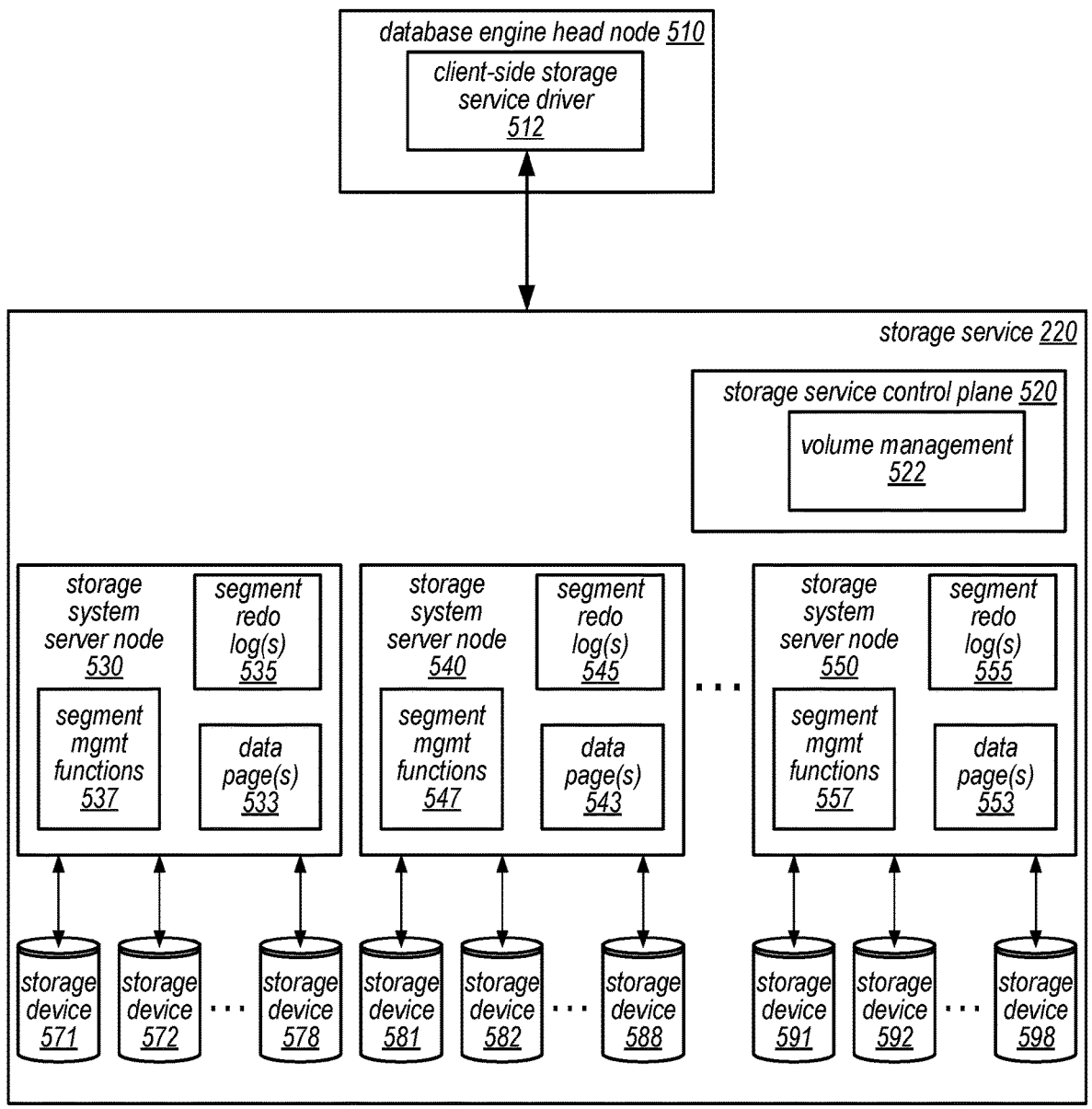
FIG. 5 is a logical block diagram illustrating a storage service that stores data for a separate database service, according to some embodiments.

FIG. 5 is a logical block diagram illustrating a storage service that stores data for a separate database service, according to some embodiments. A database engine head node 510 may include a client-side storage service driver 512. Storage service 220 may implement, in various embodiments, multiple storage nodes (including those shown as 530, 540, and 550), each of which includes storage for data pages, redo logs for the segment(s) it stores, system metadata for database engine head 510 (e.g., data dictionary data, transaction table data etc.) and hardware and/or software may perform various segment management functions. For example, each storage node may include hardware and/or software may perform at least a portion of any or all of the following operations: replication (locally, e.g., within the storage node), coalescing of redo logs to generate data pages, crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments.

In the example illustrated in FIG. 5, storage node 530 includes data page(s) 533, segment redo log(s) 535, segment management functions 537, and attached storage devices 571-578. Similarly, storage node 540 includes data page(s) 543, segment redo log(s) 545, segment management functions 547, and attached storage devices 581-588; and storage node 550 includes data page(s) 553, segment redo log(s) 555, segment management functions 557, and attached storage devices 591-598.

Storage service 220 may implement storage service control plane 520 to perform various service management operations, in some embodiments. In at least some embodiments, storage service control plane 520 may implement volume management 522 which may be implemented to create database volumes for new databases, facilitate opening and closing of database volumes by clients, and/or recovery operations, in some embodiments.

Figure 6:
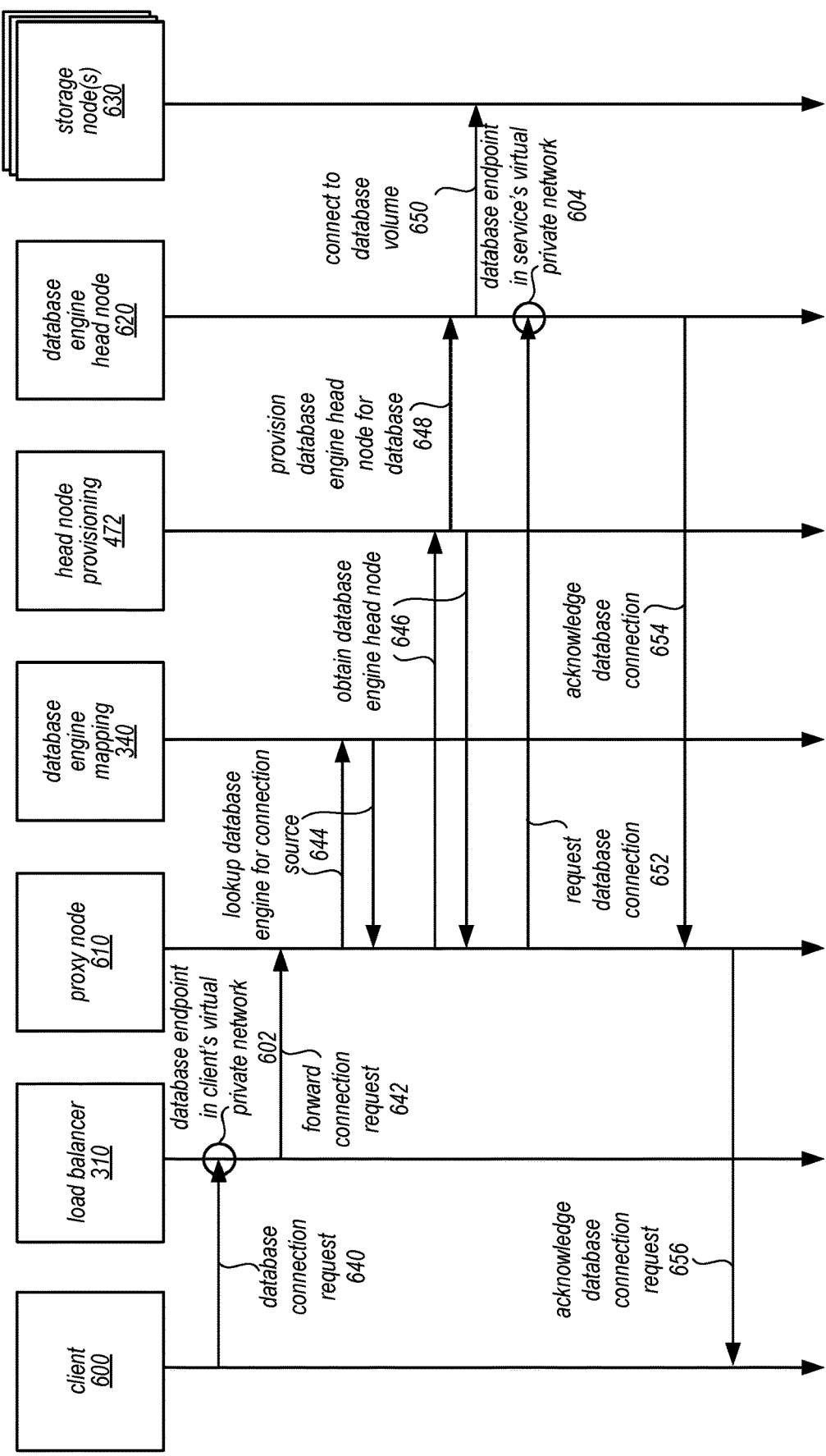
FIG. 6 is a logical block diagram illustrating interactions to connect a client to a database hosted in a database service via a proxy service, according to some embodiments

FIG. 6 is a logical block diagram illustrating interactions to connect a client to a database hosted in a database service via a proxy service, according to some embodiments. A client 610, similar to clients 310, discussed above with regard to FIG. 3, may send a database connection request to a network endpoint associated with the targeted database in a virtual private network for client 602 (e.g., a service endpoint for database service 210 or database hosted by database service 210 within the virtual private network). Load balancer 310 may be able to receive the connection request via the endpoint 602 and select a proxy node 610 to forward the connection request 642, in some embodiments.

Proxy node 610 may perform a lookup 644 to database engine mapping to obtain a network endpoint for a database engine according to a source of the connection (e.g., by the targeted database endpoint 602). If no database engine is currently assigned or active for the database, then proxy node 610 may obtain a database engine head node 646 from head node provisioning 472 for database service 210. Head node provisioning 472 may select a database engine head node 620 from a warm pool and provision 648 that database engine head node 620 to provide access to the targeted database. Database engine head node 620 may perform operations to connect 650 to the database volume for the target database at storage nodes 630. Head node provisioning 472 may provide the database engine head node's database endpoint 604 in database services virtual private network 604 to proxy node 610. Proxy node 610 may then issue a connection request 652 to data base engine head node 620 at endpoint 604. Database engine head node 620 may acknowledge the database connection 654 which may allow proxy node 610 to acknowledge the database connection 656 with client 600.

Figure 7:
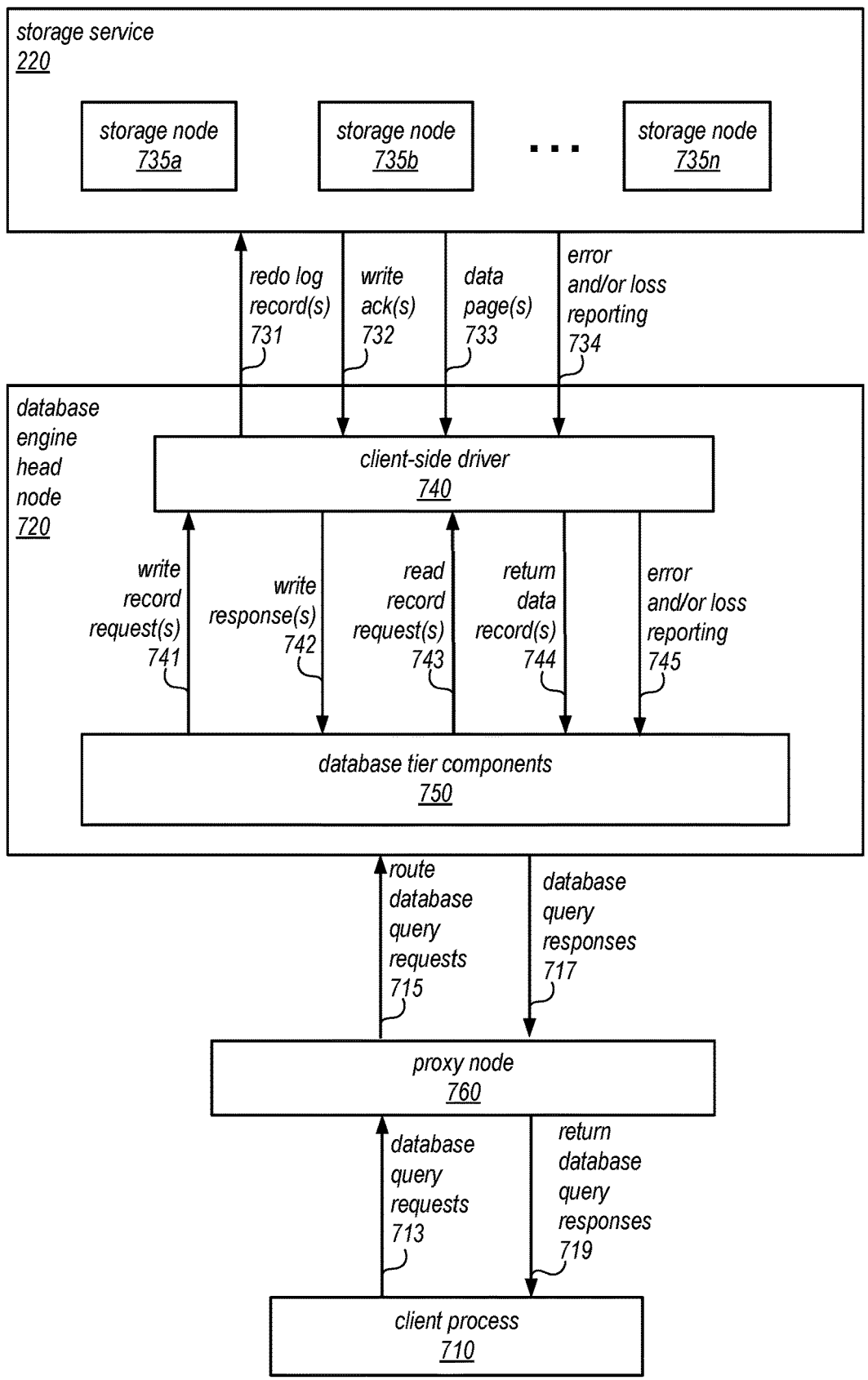
FIG. 7 is a block diagram illustrating the use of a separate storage service for a database service accessed via a proxy service, according to some embodiments.

FIG. 7 is a block diagram illustrating the use of a separate storage service for a database service accessed via a proxy service, according to some embodiments. In this example, one or more client processes 710 may store data to one or more databases maintained by a database system that includes a database engine head node 720 and a storage service 220. In the example illustrated in FIG. 7, database engine 7 head node 20 includes database tier components 750 and client-side driver 740 (which serves as the interface between storage service 220 and database tier components 760). In some embodiments, database tier components 750 may perform functions such as those performed by query parsing, optimization and execution component 405 and transaction and consistency management component 430 of FIG. 4, and/or may store data pages, transaction logs and/or undo logs (such as those stored by data page cache 435, transaction log 440 and undo log 445 of FIG. 4).

In this example, one or more client processes 710 may send database query requests 715 (which may include read and/or write requests targeting data stored on one or more of the storage nodes 735a-735n) to a connected proxy node 760. Proxy node 760 may route the database query requests 715 to database tier components 750, and may receive database query responses 717 from database tier components 750 (e.g., responses that include write acknowledgements and/or requested data) and return them 719 to client processes 710. Each database query request 713 that includes a request to write to a page may be parsed and optimized to generate one or more write record requests 741, which may be sent to client-side driver 740 for subsequent routing to storage service 220. In this example, client-side driver 740 may generate one or more redo log records 731 corresponding to each write record request 741, and may send them to specific ones of the storage nodes 735 of storage service 220. Storage service 220 may return a corresponding write acknowledgement 723 for each redo log record 731 to database engine head node 720 (specifically to client-side driver 740). Client-side driver 740 may pass these write acknowledgements to database tier components 750 (as write responses 742), which may then send corresponding responses (e.g., write acknowledgements) to one or more client processes 710 as one of database query responses 719.

In this example, each database query request 713 that includes a request to read a data page may be parsed and optimized to generate one or more read record requests 743, which may be sent to client-side driver 740 for subsequent routing to storage service 220. In this example, client-side driver 740 may send these requests to specific ones of the storage nodes 735 of storage service 220, and storage service 220 may return the requested data pages 733 to database engine head node 720 (specifically to client-side driver 740). Client-side driver 740 may send the returned data pages to the database tier components 750 as return data records 744, and database tier components 750 may then send 717 the data pages to proxy node 760 which may return the results to one or more client processes 710 as database query responses 719.

In some embodiments, various error and/or data loss messages 734 may be sent from storage service 220 to database engine head node 720 (specifically to client-side driver 740). These messages may be passed from client-side driver 740 to database tier components 760 as error and/or loss reporting messages 745, and then to one or more client processes 710 along with (or instead of) a database query responses 717 and 719.

In some embodiments, the APIs 731-734 of storage service 220 and the APIs 741-745 of client-side driver 740 may expose the functionality of the storage service 220 to database engine head node 720 as if database engine 720 were a client of storage service 220. For example, database engine head node 720 (through client-side driver 740) may write redo log records or request data pages through these APIs to perform (or facilitate the performance of) various operations of the database system implemented by the combination of database engine head node 720 and storage service 220 (e.g., storage, access, change logging, recovery, and/or space management operations). As illustrated in FIG. 7, storage service 220 may store data blocks on storage nodes 735a-735n, each of which may have multiple attached SSDs. In some embodiments, storage service 220 may provide high durability for stored data block through the application of various types of redundancy schemes.

Note that in various embodiments, the API calls and responses between database engine head node 720 and storage service 220 (e.g., APIs 731-734) and/or the API calls and responses between client-side driver 740 and database tier components 750 (e.g., APIs 741-745) and the calls and responses 715 and 717 between proxy node 760 and database tier components 750 in FIG. 7 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C # and Perl to support integration with database engine head node 720 and/or storage service 220.

Figure 8:
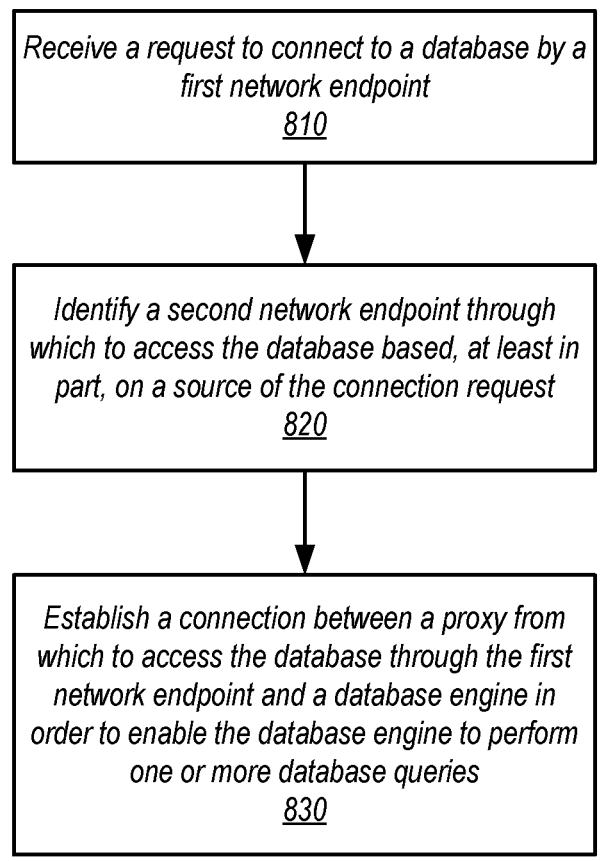
FIG. 8 is high-level flowchart illustrating various methods and techniques to implement a dynamic proxy for databases, according to some embodiments.

The database service and storage service discussed in FIGS. 2 through 7 provide examples of a system that may implement a dynamic proxy for databases. However, various other types of database systems may implement a dynamic proxy for databases. For example, a database system that utilizes storage locally attached to a node may implement a dynamic proxy for databases. FIG. 8 is high-level flowchart illustrating various methods and techniques to implement a dynamic proxy for databases, according to some embodiments. Various different systems and devices may implement the various methods and techniques described below, either singly or working together. For example, a proxy node as discussed above may implement the various methods. Alternatively, a combination of different systems and devices may implement the various methods. Therefore, the above examples and or any other systems or devices referenced as performing the illustrated method, are not intended to be limiting as to other different components, modules, systems, or configurations of systems and devices.

As indicated at 810, a request to connect a database may be received by a first network endpoint, in some embodiments. For example, the first network endpoint may be a network interface or address that is associated with a database (or system or service for hosting the database within a network), such as a virtual network address or interface implemented as an overlay of an underlying physical network address or interface for a private or virtual private network, in some embodiments. For example, the first network endpoint may be an Internet Protocol (IP) address within a virtual private cloud of a provider network that serves as an endpoint to database service that hosts a database on behalf of a user, owner, or other entity of the virtual private cloud. The request may include, as part of metadata in a network packet or other metadata for the request the identity of the first network endpoint. For example, the first network endpoint may be implemented by a networking system or service that routes the connection request to a proxy, such as a proxy node, which may include in a header the metadata that identifies the first network endpoint. In some embodiments, the request may be formatted according to an API or other protocol that indicates or specifies a proxy connection is desired (e.g., instead of a direct connection). For example, the database connection request may be a "proxy-connection request" which indicates that a proxy is to be used to connect a client to the database instead of connecting the client to the database directly.

As indicated at 820, a second network endpoint through which to access the database may be identified based, at least in part, on a source of the connection request, in some embodiments. For example, the source of the connection request may be identified according to the first network endpoint. In some embodiments, user identifiers, device identifiers (e.g., MAC address), or other information may be used to identify the source in addition to or instead of the first network endpoint. Mapping information for the source may be maintained, as discussed above with regard to FIG. 3, in some embodiments, which may map various ones of the above information to the source. For example, first network endpoint identifiers may be mapped to second network endpoint identifiers, in some embodiments. Similarly, user identifiers, device identifiers, or other information indicative of the source may be mapped to a second network endpoint, in some embodiments.

As indicated at 830, a connection may be established between a proxy from which to access the database through the first network endpoint and a database engine in in order to enable the database engine to perform one or more database queries, in some embodiments. For example, database connection communications or protocols (e.g., to establish a secure or encrypted communication channel, as discussed below) may be performed between the proxy and the database engine so that the proxy can direct requests to perform database queries through the second network endpoint to the database engine, in some embodiments. The proxy may, in some embodiments, return or perform similar connection communications with a client that submitted the request to connect to the database in order to simulate a direct connection between the client and the database engine, in some embodiments.

Figure 9:
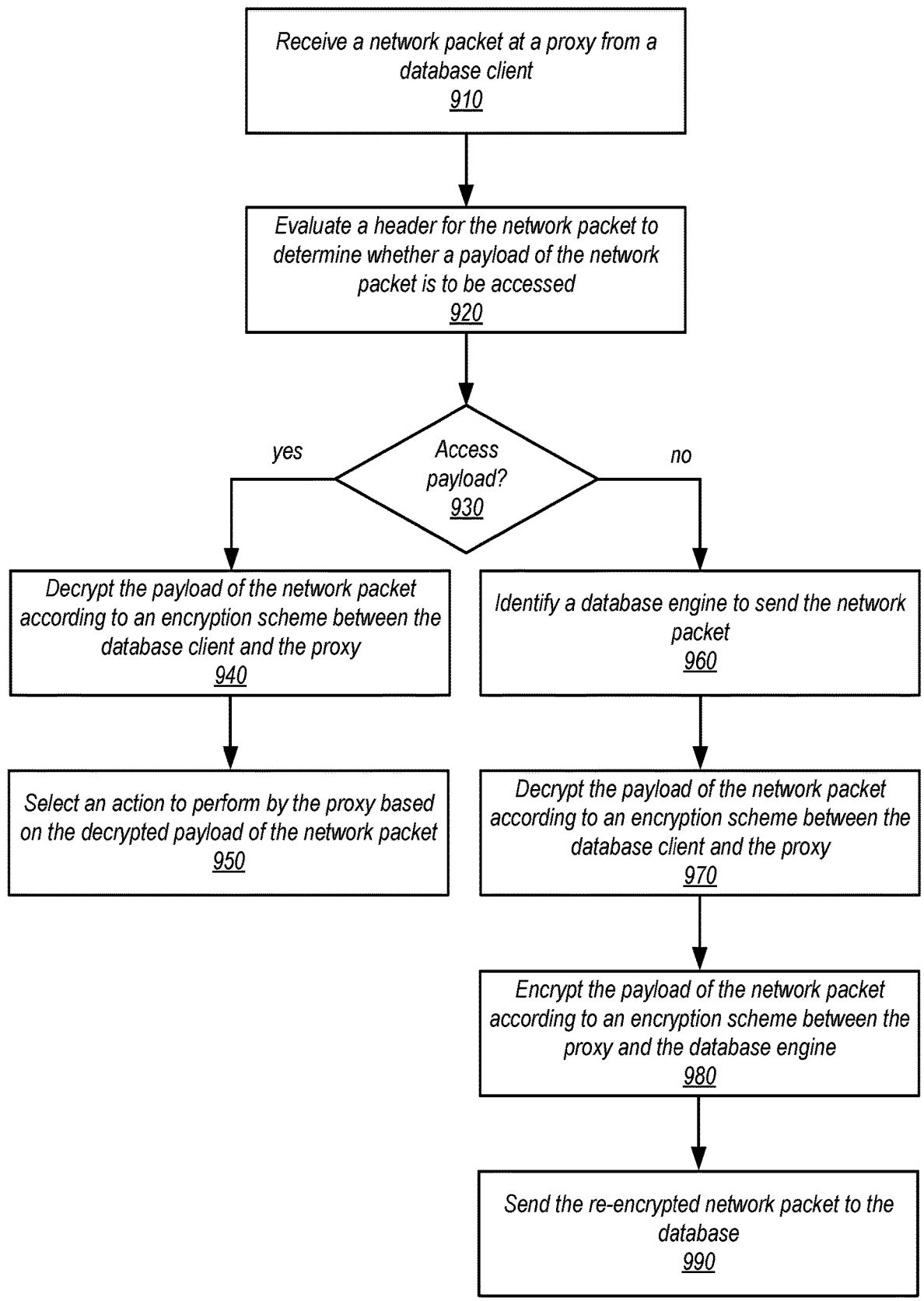
FIG. 9 is high-level flowchart illustrating various methods and techniques to implement selectively accessing packet payloads at a dynamic proxy for a database, according to some embodiments.

A dynamic proxy may dynamically choose how to process incoming network traffic (e.g., network packets) in some embodiments. Some network packets, for instance, may only receive lightweight processing in order to forward the network packets on to a database engine, while other network packets may involve heavyweight processing to evaluate the payload of the network packet. By dynamically choosing how to process network traffic, the proxy can operate in a highly performant manner, saving resource utilization for processing particular kinds of network traffic while utilizing minimal resources to process other kinds of network traffic (which could enable the proxy to be multi-tenant and/or serve many more connections than would processing all incoming network traffic the same fashion). FIG. 9 is high-level flowchart illustrating various methods and techniques to implement selectively accessing packet payloads at a dynamic proxy for a database, according to some embodiments. As indicated at 910, a network packet may be received at a proxy from a database client. The network packet may be received via a communication protocol or channel established between the database client and proxy or may be sent as part of an attempt to establish a connection, in some embodiments.

As indicated at 920, a header for the network packet may be evaluated to determine whether a payload of the network packet is to be accessed, in some embodiments. For example, the head of the packet may indicate the type of operation or request instructed in the payload of the packet. In some embodiments, the source of the network packet may be determinative as to whether the payload of the network packet may need to be accessed in order to process the packet. For network packets for which the payload may need to be accessed, as indicated by the positive exit from 930, the payload of the network packet may be decrypted according to an encryption scheme between the database client and the proxy, in some embodiments. For example, certificate-based encryption may be implemented allowing secure communication between the database client and the proxy, in some embodiments. An encryption certificate service may be implemented, in some embodiments, to coordinate the distribution and/or rotation of certificates between clients, proxies, and database engines, in some embodiments (e.g., an encryption certificate service implemented as part of provider network 200 in FIG. 2 above). Once decrypted, the payload of the network packet may be used to select an action to perform by the proxy, as indicated at 950, in some embodiments. For example, connection requests may be identified and performed, disconnection requests may be identified and performed, or other database management operations (e.g., requests that may be directed to a database service control plane instead of a database engine). In another example embodiment, simple query processing, such as responses to indicate that the database connection is still active may be identified and performed.

As indicated by the negative exit from 930, a database engine may be identified to send the network packet if the payload is not to be accessed, in some embodiments, as indicated at 960. In this way, resources to parse, evaluate, and otherwise handle the payload may not be consumed if not relevant to proxy actions, in some embodiments. Similar to the database engine identification performed above with regard to FIG. 8, source information in the header, for instance, may be used to map the source to the database engine. In some embodiments, active proxy node connections with database engines may be mapped locally or stored in hardware optimized routing storage (e.g., a TCAM or other route lookup optimized memory) or as part of a local routing table that the proxy uses to forward network packets for which the payload of the packet is not accessed. As indicated at 970, the payload of the network packet may be decrypted according to the encryption scheme between the database client and the proxy, in some embodiments. The payload may then be encrypted according to an encryption scheme between the proxy and the database engine, in some embodiments, as indicated at 980. A different encryption key or scheme may be applied between the database engine and proxy as compared to the proxy and database client, in some embodiments. (e.g., different certificates). As indicated at 990, the re-encrypted network packet may be sent to the database engine, in some embodiments (e.g., instructing a database query or other database action).

Figure 10:
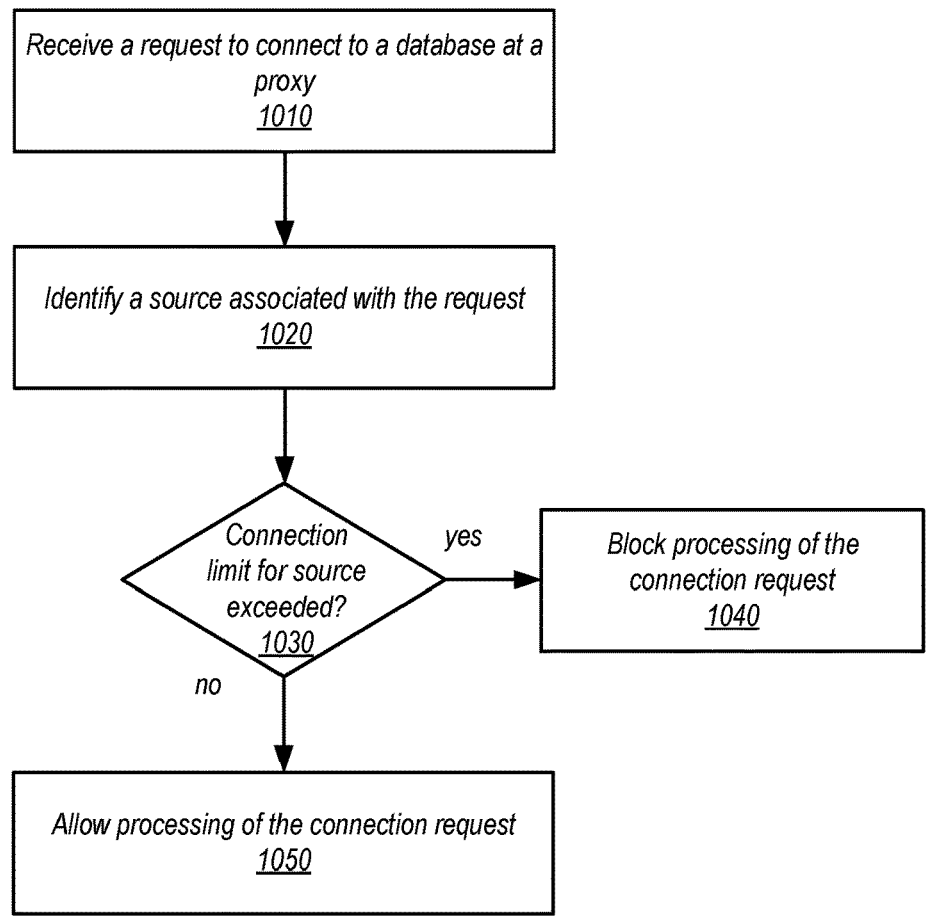
FIG. 10 is high-level flowchart illustrating various methods and techniques to implement limiting connection requests to a dynamic proxy for databases, according to some embodiments.

Because proxies may be multi-tenant, or at least be a proxy for multiple connections, in some embodiments, control and/or safety mechanisms may be implemented by a proxy in order to protect the proxy (and connected clients and database engines from malicious behavior or failures). FIG. 10 is high-level flowchart illustrating various methods and techniques to implement limiting connection requests to a dynamic proxy for databases, according to some embodiments. As indicated at 1010, a proxy may receive a request to connect to a database, in various embodiments. Similar to the discussions above, the proxy may identify a source associated with the request, as indicated at 1020. Limits or thresholds may be imposed on sources (e.g., user accounts, clients, applications, systems, or other entities) in order to protect the proxy from being victim to malicious behavior, such as Denial of Service (DOS) attacks, in some embodiments. As indicated at 1030, for example, a connection source may be limited to a number of proxy connections, in some embodiments. The connection limitation may be per proxy node (or may be across a proxy service at any proxy node), in some embodiments. Connection counts for sources may be shared by a gossip-based protocol, in some embodiments, or collected and periodically pushed to proxy nodes by a centralized component, in other embodiments. In this way, a source could not exceed the connection limit and successfully obtain a connection via another proxy in embodiments that utilize a pool or fleet of proxy nodes. If the connection request would exceed the connection limit for the source, then as indicated at 1040, processing of the connection request may be blocked, in some embodiments. For example, an error request may be returned, or all incoming connection request from that source may be ignored, dropped, or discarded, in some embodiments. If the connection request does not exceed the limit, then as indicated at 1050, processing of the connection request may be allowed, in various embodiments (e.g., identifying a second network endpoint, establishing a connection between the proxy and database engine, etc.).

Figure 11:
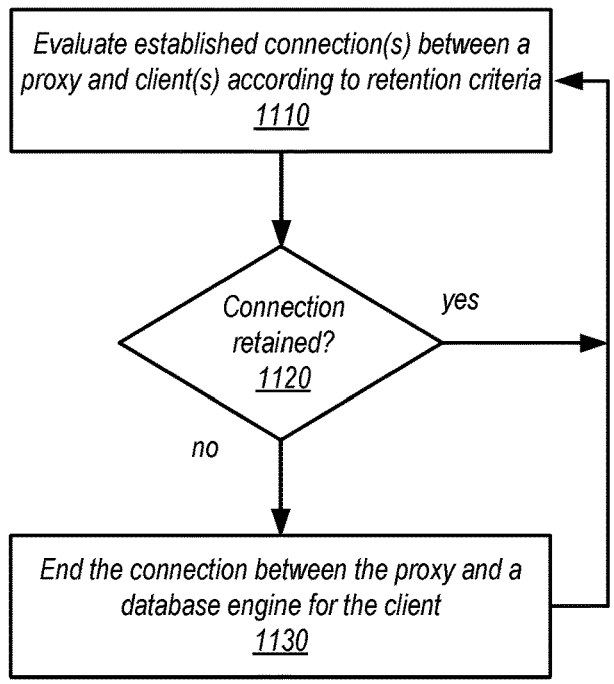
FIG. 11 is high-level flowchart illustrating various methods and techniques to implement disconnecting client connections to a dynamic proxy for databases, according to some embodiments.

In some embodiments, database connections or client connections may remain open unless explicitly closed or disconnected. However, client errors or failures, or lack of use could cause open connections to a database to linger that are not being used, wasting proxy node resources, in some embodiments. FIG. 11 is high-level flowchart illustrating various methods and techniques to implement disconnecting client connections to a dynamic proxy for databases, according to some embodiments. As indicated at 1110, established connection(s) between a proxy and client(s) may be evaluated according to retention criteria, in some embodiments. For example, length of time since last traffic received on the connection may be evaluated with respect to a time threshold. In some embodiments, the amount of network traffic or type of network traffic (e.g., to ignore non-database access related traffic for purposes of retaining a connection) may be evaluated with respect retention criteria (e.g., how often are request made, are the requests database queries or other access requests), in some embodiments. If retention criteria for an established connection is not satisfied, then the database connection between the proxy and the database engine on behalf of the client may not be retained. Similarly, the client connection between the proxy and the database could be disconnected (e.g., according to the same or different criteria). For example, the retention criteria for a connection between a client and proxy may be an evaluation of whether a client responds to protocols or communications to test if the client is "live.". As indicated by the negative exit from 1120, connections not retained may be ended between the proxy and database engine for the client, in some embodiments. For example, communications to close the connection may be instigated by the proxy, in some embodiments. Evaluations may be performed, periodically, aperiodically, or in certain scenarios (e.g., when utilized connections at a proxy are above a 90% threshold), in some embodiments.

Figure 12:
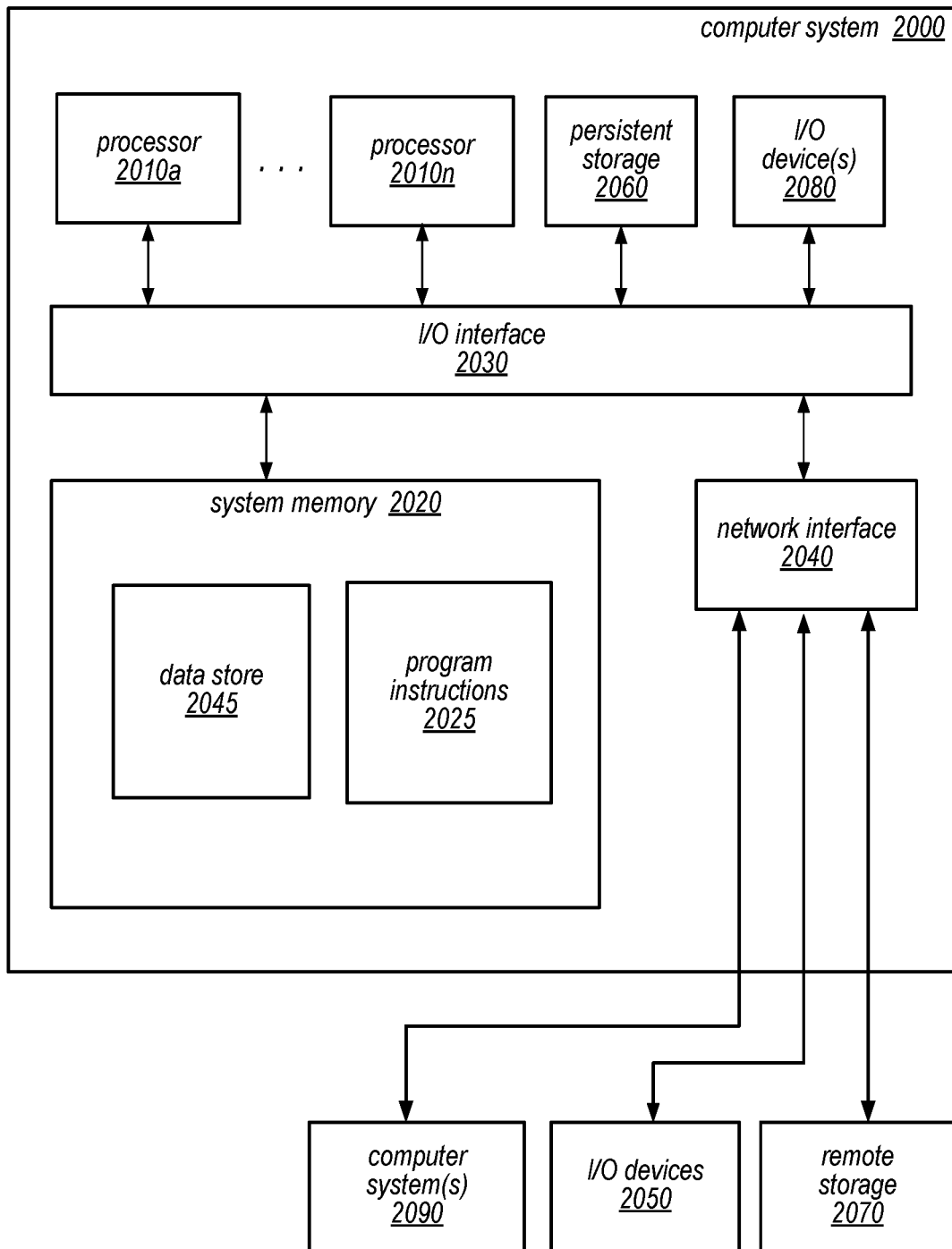
FIG. 12 is a block diagram illustrating an example computer system, according to various embodiments.

FIG. 12 is a block diagram illustrating an example computer system, according to various embodiments. For example, computer system 2000 may implement a proxy node, database engine head node, or one of a plurality of storage nodes of a separate distributed storage system that stores database tables and associated metadata on behalf of clients, in various embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that may store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, as described herein. For example, the information described herein as being stored by the database tier (e.g., on a primary node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, data pages, data records, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, primary nodes, read-only node nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive, from a client at a proxy, a request to connect to a database received by a first network endpoint;
evaluate, by the proxy, a header of a network packet of the request to determine that a payload of the network packet is to be accessed;
access, by the proxy, data to lookup a second network endpoint through which to access the database based, at least in part, on a source identified for the request and the payload of the network packet;
establish, by the proxy, a connection from which to access the database through the first network endpoint and a database engine through the second network endpoint;
receive one or more database queries from the client at the proxy; and
send, by the proxy, the one or more database queries to be performed by the database engine through the connection.

2. The system of claim 1, wherein the program instructions cause the at least one processor to further perform the method to at least:
responsive to the request, cause the database engine to be provisioned from a pool of standby database engines that can access the database.

3. The system of claim 1, wherein the program instructions cause the at least one processor to further perform the method to at least:
receive, from a second client at the proxy, a second request to connect to the database received by the first network endpoint;
determine that a connection limit for the source of the second request would exceed a connection limit for the source of the second request; and
responsive to the determination, block the second request.

4. The system of claim 1, wherein the proxy is implemented as part of a proxy service of a provider network, wherein the database engine is implemented as part of a database service of the provider network, and wherein the database is stored in a storage service for the provider network.

5. A method, comprising:
responsive to a request to connect to a database received by a first network endpoint:
evaluating a header of a network packet of the request to determine that a payload of the network packet is to be accessed;
identifying a second network endpoint through which to access the database based, at least in part, on a source of the request and the payload of the network packet; and
establishing a connection between a proxy from which to access the database through the first network endpoint and a database engine in order to enable the database engine to perform one or more database queries.

6. The method of claim 5, wherein identifying the second network endpoint through which to access the database comprises accessing information that maps the first network endpoint as the source of the request to the second network endpoint.

7. The method of claim 5, further comprising:
receiving a network packet associated with another request to the database by the first network endpoint at the proxy;
evaluating a header of the network packet associated with the other request to determine that a payload of the network packet associated with the other request is not to be accessed; and
sending, via the connection, the network packet associated with the other request to the database engine from the proxy.

8. The method of claim 5, further comprising:
decrypting one or more communications received from a client by the first network endpoint to request performance of the one or more database queries according to an encryption scheme between the client and the proxy; and
encrypting one or more communications send from the proxy via the connection to the database engine to request performance of the one or more database queries according to an encryption scheme between the proxy and the database engine.

9. The method of claim 5, further comprising:
evaluating, by the proxy, a client connection established between a client that sent the request to connect and the proxy according to retention criteria; and
ending the connection between the proxy and the database engine according to an evaluation that the client connection does not satisfy the retention criteria.

10. The method of claim 5, further comprising:
receiving a second request associated with the source to connect to the database received by the first network endpoint;
determining that a connection limit for the source would exceed a connection limit for the source; and
responsive to the determining, blocking the second request.

11. The method of claim 5, further comprising:
further responsive to the request, causing the database engine to be provisioned from a pool of standby database engines that can access the database before establishing the connection between the proxy and the database engine.

12. The method of claim 5, further comprising:
responsive to a second request to connect to the database received by the first network endpoint:
identifying the second network endpoint through which to access the database based, at least in part, on a source of the second request;
establishing a second connection between a second proxy and the database through the second network endpoint and the database engine in order to enable the database engine to perform one or more other database queries through the second connection.

13. A non-transitory, computer-readable storage medium, storing program instructions that when executed by one or more computing devices cause the one or more computing devices to implement:
receiving, from a client, a request to connect to a database received by a first network endpoint;
evaluating a header of a network packet of the request to determine that a payload of the network packet is to be accessed;
identifying a second network endpoint through which to access the database based, at least in part, on a source of the request and the payload of the network packet;
establishing a connection between a proxy from which to access the database through the first network endpoint and a database engine; and
causing the database engine to perform one or more database queries received from the client via the connection.

14. The non-transitory, computer-readable storage medium of claim 13, wherein the program instructions cause the one or more computing devices to further implement:
further responsive to the request, causing the database engine to be provisioned from a pool of standby database engines that can access the database before establishing the connection between the proxy and the database engine.

15. The non-transitory, computer-readable storage medium of claim 13, wherein the program instructions cause the one or more computing devices to further implement:
receiving a network packet associated with another request to the database by the first network endpoint at the proxy;
evaluating a header of the network packet associated with the other request to determine that a payload of the network packet associated with the other request is not to be accessed; and
sending, via the connection, the network packet associated with the other request to the database engine from the proxy.

16. The non-transitory, computer-readable storage medium of claim 15, wherein the program instructions cause the one or more computing devices to further implement:
before sending the network packet associated with the other request to the database engine:
decrypting the payload of the network packet associated with the other request according to an encryption scheme between the proxy and the client; and
encrypting the payload of the network packet associated with the other request according to an encryption scheme between the proxy and the database engine.

17. The non-transitory, computer-readable storage medium of claim 13, wherein the program instructions cause the one or more computing devices to further implement:
evaluating, by the proxy, a client connection established between the client and the proxy according to retention criteria; and ending the client connection according to an evaluation that the client connection does not satisfy the retention criteria.

18. The non-transitory, computer-readable storage medium of claim 13, wherein the proxy is implemented as part of a proxy service of a provider network, wherein the database engine is implemented as part of a database service of the provider network, wherein the request specifies a proxy-based connection for the database, and wherein the proxy further performs the receiving, the identifying, the establishing, and the causing for a different database associated with a different user account than the database.

19. The non-transitory, computer-readable storage medium of claim 13, wherein the proxy is implemented as part of a proxy service of a provider network, wherein the database engine is implemented as part of a database service of the provider network, and wherein the request specifies a proxy-based connection for the database.

* * * * *